United States Patent [19]
Hadden

[11] 3,807,448
[45] Apr. 30, 1974

[54] MINIATURE VALVE

[76] Inventor: Edward H. Hadden, 12 Laurel Dr., Granby, Conn. 06035

[22] Filed: June 19, 1972

[21] Appl. No.: 263,868

[52] U.S. Cl. ............ 137/596.14, 137/625.6, 251/45, 251/61.2
[51] Int. Cl. ......................................... F16k 31/385
[58] Field of Search ........ 137/596.14, 625.6, 625.66; 251/61, 61.1, 61.2, 61.3, 61.4, 61.5, 45, 46

[56] References Cited
UNITED STATES PATENTS

| | | | |
|---|---|---|---|
| 1,441,576 | 1/1923 | Haas | 251/45 X |
| 2,573,369 | 10/1951 | Snoddy | 251/46 X |
| 2,868,483 | 1/1959 | Krueger | 251/61.3 X |
| 1,521,355 | 12/1924 | Burns | 251/45 |
| 2,705,046 | 3/1955 | Schroeder | 251/61.4 X |
| 2,861,587 | 11/1958 | Hursen | 251/61 X |
| 3,470,910 | 10/1969 | Loveless | 137/625.6 UX |
| 3,584,652 | 6/1971 | Huntington | 137/625.66 X |
| 3,653,408 | 4/1972 | Coiner | 137/625.6 |
| 3,670,771 | 6/1972 | Dewberry | 137/625.6 |

*Primary Examiner*—Henry T. Klinksiek
*Assistant Examiner*—Robert J. Miller

[57] ABSTRACT

A miniature valve is presented having an extremely high response switching speed and which acts as a fluid amplifier. The valve has poppet elements normally positioned in a first position to vent a supply line and which, upon receipt of a low signal pressure, move to a second position to deliver high pressure to the supply line. The poppets are in the form of a spool valve which has, adjacent one end, a pressure bearing flange which provides a backing support for the power diaphragm which operates the valve.

21 Claims, 2 Drawing Figures

PATENTED APR 30 1974          3,807,448

3,807,448

MINIATURE VALVE

BACKGROUND OF THE INVENTION

1. Field of the Invention

This invention relates to the field of miniature valves. More particularly, this invention relates to the field of miniature pneumatic valves which have very fast response times and which function as fluid amplifiers.

2. Description of the Prior Art

As interest and applications in the field of fluidics have expanded, the development of a reliable, economical miniature value having extremely fast response time has been a long sought after objective. A typical approach to miniaturization in the prior art has simply been to scale down larger sized valves in an attempt to produce an effective and acceptable miniature valve. However, it quickly became apparent to those skilled in the field that the approach of simply scaling down larger existing valves was not workable because many problems were encountered such as flow levels, response time, and required operating pressure levels.

A prior art device available from Northeast Fluidics, Inc. of Bethany, Connecticut is a normally closed three way valve having a pair of poppets on opposite ends of a stem. The valve is normally closed so that one of the poppets closes off a high pressure supply and the other poppet opens an output line to exhaust. A control signal deflects a diaphragm whereby a bleed port is closed and pressure is then built up on a power diaphragm to move the stem whereby the previously closed poppet is opened and the previously open poppet is closed. As a result, the high pressure supply is then connected to the output line. Although this prior art device is similar in many general respects to the miniature valve of the present invention, the valve of the present invention does differ in several important respects whereby the present invention results in a smaller, more reliable, and faster responding valve than this prior art device.

SUMMARY OF THE INVENTION

The miniature valve of the present invention is a normally closed three way poppet type valve as is the prior art valve discussed above which is attainable from Northeast Fluidics, Inc. The miniature valve of the present invention is also generally characterized as being a spool valve movable within a housing with poppets on opposite ends of the spool for alternately connecting an output line either to exhaust or to a pressurized supply. However, there are several important and distinguishing features in this invention over that prior art valve.

One such important distinguishing feature of the present invention is found in a support flange on the spool element which serves as a support and force transmitting element in cooperation with a deflectable diaphragm which is pressure loaded to activate the spool and reverse the arrangement of the poppet valves. The presence of the support flange maximizes the transmission of forces developed on the diaphragm resulting from an actuating pressure signal, and thus the size of the diaphragm and the volume of the chamber in which it is located can be significantly reduced whereby the miniaturization of the valve is enhanced and the speed response characteristics of the valve are improved by reducing the required response time. A nozzle plate element in the valve defines a bleed port which can be restricted or closed by a signal pressure to actuate the valve. Upon restriction or closing of the bleed port the power diaphragm is pressurized to actuate the valve; upon removal of the actuating signal the bleed valve is opened to vent the fluid providing the actuating load on the power diaphragm.

Another important distinguishing feature is found in the nozzle plate which is contoured to form a conical recess leading to the bleed port, and that conical recess cooperates with a conformingly shaped conical projection on a flow port at the end of the spool valve whereby response time in closing the valve is also significantly enhanced.

In addition, the closing of the bleed valve is accomplished by the deflection of a diaphragm upon receipt of the actuating signal, the diaphragm cooperating with a frustoconical projection on the nozzle plate, and this projection and the surface of the nozzle plate are contoured so that an overload condition will result in the diaphragm being brought into supporting engagement with the nozzle plate without being punctured by the projection.

Accordingly, one object of the present invention is to provide a novel and improved miniaturized fluid operated valve.

Still another object of the present invention is to provide a novel and improved miniaturized valve having extremely fast response time.

Still another object of the present invention is to provide a novel and improved miniaturized valve with reduced pressure operating requirements.

Still another object of the present invention is to provide a novel and improved miniaturized valve in which diaphragms are employed and wherein diaphragm wear is minimized and the danger of diaphragm puncturing is substantially eliminated.

Other objects and advantages will be apparent to and understood by those skilled in the art by the following detailed description and drawings.

DESCRIPTION OF THE DRAWINGS

In the drawings, wherein like elements are numbered alike in the two figures.

DESCRIPTION OF THE PREFERRED EMBODIMENT

Figure 1:
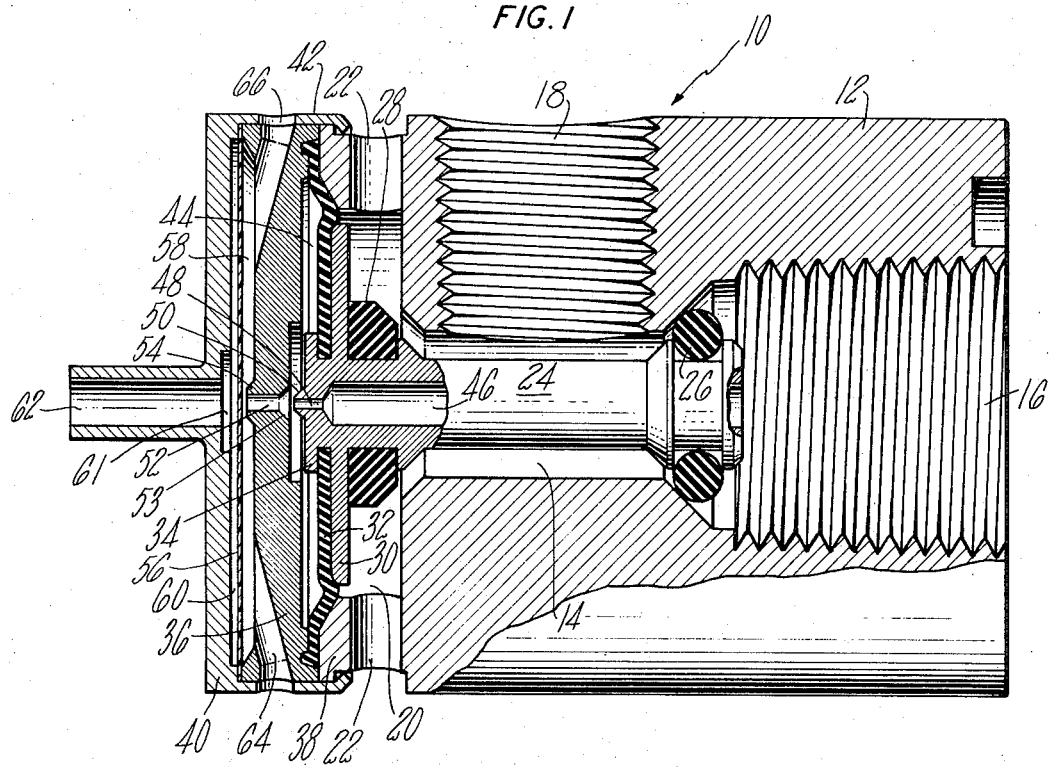
FIG. 1 is a view, partly in section, of the miniaturized valve of the present invention in the closed position.
Figure 2:
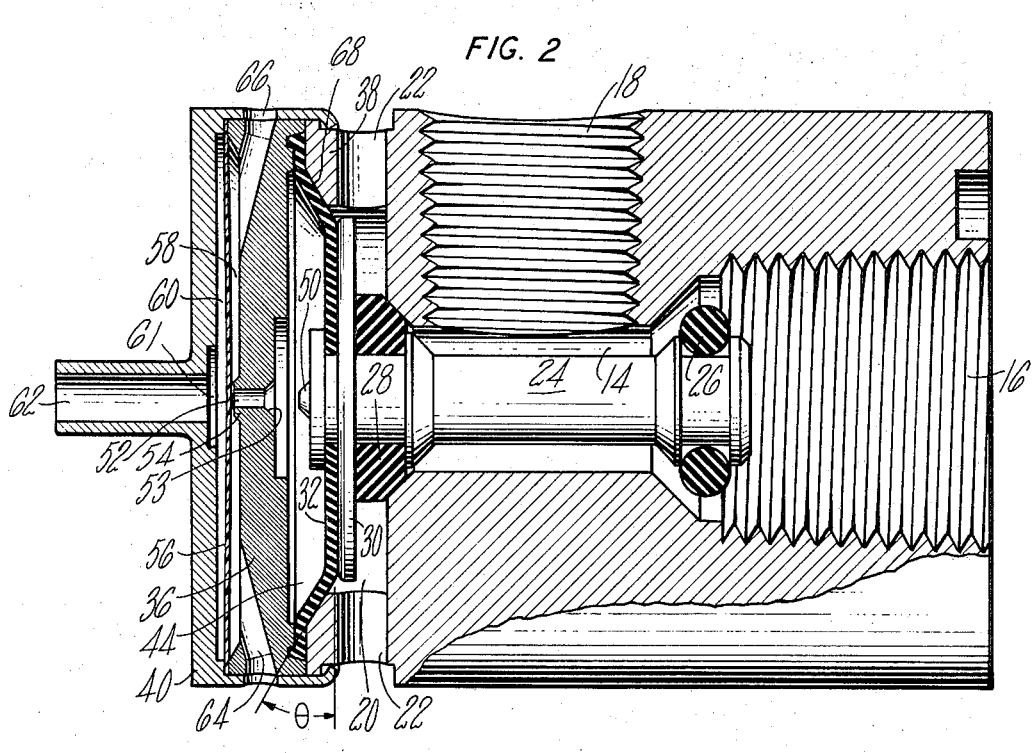
FIG. 2 is a view similar to FIG. 1 showing the miniaturized valve of the present invention in the open position.

Referring now to FIG. 1, the miniaturized valve of the present invention is indicated generally at 10. All of the parts of valve 10, other than diaphragms and sealing elements which will be specifically identified, are made of anodized aluminum. Miniaturized valve 10 has a generally cylindrical body 12 with an internal passageway 14. An internally threaded supply passage 16 at one end of the valve is connected to passageway 14, and an internally threaded outlet passage 18 is also connected to passageway 14. Appropriate supply and outlet lines can be threadably connected to passageways 16 and 18, respectively, when connecting valve 10 for operation. Passageway 14 is also connected to a chamber 20 which is in turn connected to a plurality of vent ports spaced about the periphery of the valve. A movable two position spool element 24 extending through passageway 14 is adapted in one position to place passageway 14 into fluid communication with chamber 20 and vent ports 22 whereby outlet passage 18 is connected to vent ports 22 to be exhausted and the communication between supply passage 16 and outlet passage 18 is blocked; while in the second position supply passage 16 is in fluid communication with passage 14 while the connection between passageway 14 and chamber 20 is blocked so that a pressurized fluid supply in supply passage 16 is delivered to outlet passage 18. The valve is shown in FIG. 1 in the first of the positions described above, i.e., where outlet passage 18 is vented to exhaust through passageway 14, chamber 20 and vent ports 22 and the connection between passageway 16 and chamber 14 is blocked, this being the normal closed position of the valve. FIG. 2 shows the valve in the second of the two positions described above.

Still referring to FIG. 1, an O-ring sealing gasket 26 is mounted at the right end of spool 24 adjacent the inclined wall juncture between supply passage 16 and internal passage 14, and a sealing gasket 28 is mounted near the left end of spool 24 adjacent the inclined wall junction between chamber 20 and passage 14. O-ring 26 and gasket 28 are rubber elements, and depending on the position of spool 24, O-ring 26 serves to seal supply passage 16 from passage 14 or gasket 28 serves to seal passage 14 from chamber 20.

Immediately adjacent to gasket 28 a disc shaped flange 30 extends from spool 24. Flange 30 is preferably formed integrally with spool 24, but it may, if desired, be a separate element mounted thereon. A diaphragm 32 is mounted on spool 24 immediately adjacent to flange 30, and the inner diameter of diaphragm 32 is retained in position by a lip 34 extending around spool 24. The outer diameter of diaphragm 32 is gripped and held in position by the outer portions of a circular nozzle plate 36 which bear against an annular shoulder 38 to firmly hold the outer diameter of the diaphragm between nozzle plate 36 and shoulder 38. A cap 40 is mounted on the end of the valve body to retain nozzle plate 36, cap 40 having an annular skirt 42 with the free end thereof swaged to grip the underside of a projection on shoulder 38 to hold the cap in place.

Still referring to FIG. 1, it can be seen that a chamber 44 is formed between diaphragm 32 and the underside of nozzle plate 36, and a central passageway 46 through spool 24 connects supply passage 16 with chamber 44 via a reduced diameter orifice 48 which extends through a frustoconical nozzle 50 on the end of spool 24. An orifice 52 of approximately twice the diameter of small orifice 50 extends through nozzle plate 36 and a frustoconical nozzle 54 mounted at the center of nozzle plate 36. The entrance wall 53 to orifice 52 from chamber 44 is flared in frustoconical shape approximately conforming to the shape of frustoconical nozzle 50 extending from spool 24, nozzle 50 being aligned with the flared wall 53 entering into orifice 52.

A signal diaphragm of a thin mylar disc 56 is held between cap 40 and nozzle plate 56 and is normally spaced from the end of frustoconical nozzle 54 as shown in FIG. 1. Diaphragm 56 defines a chamber 58 between the diaphragm and nozzle plate 36, and it also defines another chamber 60 between the diaphragm and cap 40 having an enlarged chamber portion 61. A signal line 62 is centrally mounted on cap 40 and communicates with chamber 60, to deliver operating signals to the valve. Enlarged chamber portion 61 surrounds the junction between supply line 62 and chamber 60, and supply line 62 opens into enlarged chamber portion 61. Chamber 58 is connected to a plurality of passageways 64 which extend angularly through nozzle plate 36 and communicate with bleed ports around the periphery of cap 40.

In order to prevent vibration and high pitch noise resulting from impingement of air on diaphragm 56 from nozzle 52, a small amount of viscous oil is placed in chamber 60. The enlarged chamber portion 61 is formed to prevent cohesion of the oil to the inner wall of supply line 62, which would tend to occur by capillary action. Such cohesion would reduce the area of the diaphragm 56 on which the signal pressure in line 62 can act. The presence of enlarged chamber 61 assures that the signal pressure in line 62 will act over a large enough area of diaphragm 56 so that the diaphragm is easily deflected by low signal pressures.

Still referring to FIG. 1, the valve is shown in its closed position with spool 24 moved to the left whereby O-ring gasket 26 is sealed against the interior of the valve housing so that fluid communication between supply passage 16 and internal passage 14 is blocked. Gasket 28 is positioned as shown out of engagement with the interior of body 12 so that interior passage 14 is in fluid communication with chamber 20 and vent ports 22 whereby outlet passage 18, which is always in communication with passage 14, is vented.

As long as the valve is armed, a high pressure fluid will be present in supply passage 16, this high pressure supply ranging from, for example, anywhere from 5 to 125 psi. The pressurized fluid in passage 16 communicates via internal passageway 46 of spool 14 to small orifice 48. Orifice 48 is a bleed orifice of very small size, on the order of 0.01 inches in diameter. Thus, there is a very large pressure drop with low total flow through orifice 48, and the fluid which does bleed through orifice 48 fills chamber 44 at relatively low pressure and communicates through orifice 52, chamber 48, passageway 64 and bleed port 66 to ambient.

When it is desired to activate the valve to switch it to the open condition, a signal pressure is applied to signal line 62 to actuate the valve. This actuating signal can be of very low pressure, such as on the order of 1/700th of the level of the pressure in supply passage 16. The delivery of the pressure signal to line 62 results in a very fast response of the device to switch from the closed state shown in FIG. 1 to the open state shown in FIG. 2.

Referring now to FIG. 2, the delivery of signal pressure to line 62 causes an increase in pressure in chamber 60 and deflects mylar diaphragm 56 toward nozzle plate 36. The deflection of diaphragm 58 causes the diaphragm to approach closely to or bear against nozzle 54 whereby orifice 52 is fully or substantially closed. As orifice 52 closes, the bleeding of fluid from chamber 44 is reduced or stopped, and thus the pressure in chamber 44 starts to rise toward the level of the pressure in supply passage 16. While the pressure in chamber 44 was at its low level in accordance with the FIG. 1 state, the force resulting from the pressure in passage 16 acting against the area at the right end of spool 14 overcame any rightward forces on diaphragm 56 and drove the spool to the left to the closed position of FIG. 1. However, as the pressure in chamber 44 quickly increases in response to the signal pressure which deflects diaphragm 56, a force is developed on the left face of diaphragm 32 loading the diaphragm in a rightward direction. The force on the diaphragm is directly transmitted to backing flange 30, with the result that spool 14 is driven to the right to the open position as shown in FIG. 2 when the rightward force acting on diaphragm 32 and flange 30 exceeds the leftward force acting on the other end of the spool.

It will be noted that there is a substantial area differential at the two ends of the spool. That is, the force urging the spool to the left is the product of the pressure in passage 16 and the area of the right end of the spool. Conversely, the force urging the spool to the right is the product of a pressure in chamber 44 times the effective area of diaphragm 32, and the effective area of diaphragm 32 is essentially equal to the full area of flange 30, including the area of the spool. Thus, the necessary force imbalance to drive the spool to the right to the open state of FIG. 2 occurs as the pressure fills up in chamber 44, but it occurs at a much lower pressure than the full pressure in passage 16. In a preferred embodiment of the device, the volume of chamber 44 is approximately 0.0047 cubic inches, and the spool moves to the right when the pressure in chamber 44 reaches approximately 35 percent of the pressure in passage 16. Since the volume of chamber 44 is so small, the pressure buildup therein occurs in an extremely short time span, on the order of 5 milliseconds, and thus the spool is driven to the right to the open state of FIG. 2 in extremely fast response to the application of the signal to signal line 62.

When the spool is driven to the right as in FIG. 2, gasket 28 seats firmly against the interior of body 12 whereby communication between passageway 14 and chamber 20 is totally blocked and fluid communication between supply passage 16 and outlet passage 18 is established. Thus, the high pressure supply in passage 16 is delivered to outlet passage 18 which is connected to any desired device to be actuated. Accordingly, it can be seen that the device is not only a miniature device of extremely fast response, but also it acts as an amplifier since the delivery of a very low signal pressure at line 62 results in the appearance of a very high actuating pressure at outlet 18.

An important feature of the valve of the present invention resides in the support which is given to diaphragm 32 to prevent any excess stretching and movement of the diaphragm or frictional rubbing of the diaphragm against the spool at its connection to the spool. As has previously been noted, one side of diaphragm 32 is in bearing engagement with flange 30, and thus the major portion of the diaphragm is always supported by flange 32 whereby pressure loading on the diaphragm is directly transmitted to the flange without flexing or stressing the diaphragm. In addition, annular shoulder 38 has an annular inclined surface 68 against which the diaphragm bears. When diaphragm 32 is pressure loaded as in FIG. 2, another large portion of the diaphragm adjacent the outer diameter bears against and is supported by inclined surface 38 so that stressing of the diaphragm is avoided in this vicinity also. Accordingly, almost all of the diaphragm is supported when the diaphragm is pressure loaded, only the portion spanning the gap between the end of flange 32 and shoulder 38 being unsupported, and thus stressing of the diaphragm which could lead to rupture thereof are avoided. The slope of surface 68, i.e., the angle $\theta$ which it forms with the normal to the center line of the valve, is a function of the travel of the spool and the clearance between the flange 32 and shoulder 38. The angle $\theta$ will preferably be between 20° and 40° and it will be less than 45° and greater than 10°. Otherwise, either appropriate travel of spool 24 can not be accommodated or shearing of the diaphragm may occur.

While the extremely fast response from the closed state of FIG. 1 to the open state of FIG. 2 is important and has been stressed above, fast response is equally important in going from the open state of FIG. 2 to the closed state of FIG. 1. To that end, frustoconical nozzle 50 has been formed on the left end of spool 24 defining part of orifice 48 and being of conforming shape with the frustoconically inclined surface 53 in nozzle plate 36 leading to orifice 52. The switch from the FIG. 2 state back to the FIG. 1 state is triggered by the removal of the pressure signal in signal line 62 whereupon diaphragm 56 returns to its undeflected state. As diaphragm 56 returns to its undeflected state, orifice 52 is opened whereby chamber 44 is vented through chamber 58 and passageways 64 and bleed ports 66. This reduction in the pressure in chamber 44 removes the rightward force acting on diaphragm 32 whereby the pressure in passage 16 acting on the right end of the spool drives the spool to the left. The conforming shape between nozzle 50 and the inclined surface 53 entering orifice 52 is important in that the fluid passing through orifice 48 is directed straight into the funnel shape entrance to orifice 52 so that during the closing cycle this pressurized fluid passing through passageway 46 is delivered directly to orifice 52 rather than first being dispersed into chamber 44 and then flowing through orifice 52. Furthermore, as the spool begins to move leftwardly, this direct delivery from orifice 48 into orifice 52 is increased as nozzle 50 moves closer to, but never does contact, the funnel entry of orifice 52. Also, an aspirator or eductor action is created by the direct delivery of fluid from orifice 48 to orifice 52 so that the fluid in chamber 44 is sucked into orifice 52. The combined effect of the direct delivery of the pressurized fluid from orifice 48 to orifice 52 and the suction created thereby both cooperate to almost instantaneously reduce the pressure in chamber 44 and allow the leftward cycling of the spool to return to the FIG. 1 closed state with the same response time of about 5 milliseconds as is experienced in opening the valve.

A further feature of significance in the present invention is found in the arrangement wherein the upper surface of the nozzle plate 36 is positioned to provide support for diaphragm 56 in the event of an over pressurization of the diaphragm 56. If such an over pressurization were to occur, a common defect in prior art devices is that the diaphragm becomes impalled on and is punctured by a relatively sharp nozzle such as nozzle 54 since the protrusion of the nozzle in the prior art devices is significantly longer than in the present device. However, the upper surface of the nozzle plate in the present invention is placed close to diaphragm 56, and the protrusion of nozzle 54 is relatively short so that an over pressurization of diaphragm 56 merely results in the major portion of the diaphragm being brought into supporting engagement with the surface of the nozzle plate without the occurrence of any puncturing of the diaphragm.

From the foregoing description it can be seen that a miniaturized valve having extremely fast response and being economical and reliable has been presented. A significant economy is realized in that both diaphragms 32 and 56 can be simple unreinforced diaphragms since the structure of the device provides support for the diaphragms when necessary. Merely by way of example, the significant miniaturization which can be accomplished has been indicated by the extremely small volume indicated above for chamber 44. By way of further illustration, but not limitation, a preferred configuration for the valve has a diameter of only 0.8 inches and a length of 1 and 1/16th inches from the upper surface of cap 40 to the base of body 12. By way of contrast, a typical prior art device has had a diameter of approximately 1 and 3/8 inches and a length of approximately 1 and 5/8 inches. The improved miniaturization achievable by the present invention will be particularly appreciated by designers of systems and equipment.

What is claimed is:

1. A fluid valve including:
   a valve body;
   inlet passage means in said valve body;
   outlet passage means in said valve body;
   vent port means in said valve body;
   internal passage means in said valve body, said internal passage means being connected to each of said inlet passage, said outlet passage and said vent port means;
   two position spool means extending through said internal passage means, said spool means in a first position connecting said outlet passage to said vent port means and blocking communication between said inlet passage and said outlet passage and in a second position connecting said outlet passage to said inlet passage and blocking communication between said vent port means and said outlet passage, said spool means being normally in one of said positions;
   power diaphragm means connected to said spool means;
   backing means on said spool means for engaging one side of said diaphragm means, said backing means being a flange element extending from said spool means for engaging a major portion of said power diaphragm;
   nozzle plate means located on the side of said power diaphragm means removed from said backing means, said nozzle plate means defining a first chamber between said nozzle plate means and said diaphragm means;
   internal passageway means through said spool means connecting said inlet passage means to said first chamber;
   signal diaphragm means on the side of said nozzle plate removed from said first chamber, said signal diaphragm defining a second chamber between said signal diaphragm and said nozzle plate means;
   nozzle passage means through said nozzle plate connecting said first chamber to said second chamber;
   bleed means connecting said second chamber to ambient;
   fluid in said inlet passage flowing through the internal passage in said spool to said first chamber and thence through said nozzle passage means to said second chamber and to ambient through said bleed means in the first position of said spool means;
   an end plate on said valve housing, said end plate defining a third chamber between the end plate and said signal diaphragm; and
   signal supply means for delivering an actuating signal pressure to said third chamber, said actuating signal deflecting said signal diaphragm toward said nozzle plate to restrict flow through said nozzle passage means into said second chamber whereby the pressure level in said first chamber is increased to impose a pressure load on said power diaphragm and on said backing means to move said spool means to said second position.

2. A fluid valve as in claim 1 wherein:
   said flange element engages a major segment of said power diaphragm when a pressure load is imposed on said power diaphragm.

3. A fluid valve as in claim 2 wherein:
   said backing element is in bearing engagement with said power diaphragm from the inner periphery thereof to a locus between the inner periphery and the outer periphery; and including
   shoulder means engaging the outer periphery of said power diaphragm means, said power diaphragm being held between said shoulder means and said nozzle plate.

4. A fluid valve as in claim 3 wherein:
   said shoulder means has an inclined surface for bearing engagement with said power diaphragm when a pressure load is imposed on said power diaphragm.

5. A fluid valve as in claim 4 wherein:
   said shoulder surface is inclined from 20° to 40° with respect to the normal to the center line of the valve.

6. A fluid valve as in claim 1 wherein:
   said internal passageway means through said spool means terminates in a frustoconical nozzle protruding into said first chamber, and wherein said nozzle plate has a frustoconical shaped inclined entranceway into said nozzle passage means therethrough, said frustoconical entranceway being conformingly shaped with respect to said frustoconical nozzle protruding from said spool.

7. A fluid valve as in claim 6 wherein:
   said frustoconical nozzle and conformingly shaped frustoconical inclined entranceway are in alignment and cooperate to enhance delivery of fluid from said internal passageway in the spool to said nozzle passage means.

8. A fluid valve as in claim 7 wherein:
   said frustoconical nozzle and conformingly shaped frustoconical inclined entranceway cooperate to effect an eductor action to drain fluid from said first chamber.

9. A fluid valve as in claim 1 wherein:
   said nozzle passage means terminates in a short broad based frustoconical projection beyond the surface of said nozzle plate into said second chamber, whereby overpressurization of said signal diaphragm urges a major portion of said signal diaphragm into supporting contact with the surface of said nozzle plate without rupture of said signal diaphragm.

10. A fluid valve as in claim 1 wherein:
said third chamber includes an enlarged portion connected to said signal supply means; and wherein said third chamber has a viscous damping fluid therein, said enlarged portion preventing adhesion of the viscous fluid to said signal supply means.

11. A fluid valve as in claim 1 wherein:
said signal supply means in a fluid supply line connected to said enlarged portion of said third chamber.

12. A fluid valve as in claim 1 wherein:
said valve is a miniaturized valve, and wherein the signal pressure delivered to said third chamber required to move the spool from the first position to the second position is approximately 1/700 of the pressure in said supply passage.

13. A fluid valve including:
a valve body;
inlet passage means in said valve body;
outlet passage means in said valve body;
internal passage means in said valve body, said internal passage means being connected to each of said inlet passage and said outlet passage means;
two position spool means extending through said internal passage means, said spool means in a first position blocking communication between said inlet passage and said outlet passage and in a second position connecting said outlet passage to said inlet passage, said spool means being normally in one of said positions;
power diaphragm means connected to said spool means;
backing means on said spool means for engaging one side of said diaphragm means, said backing means being a flange element extending from said spool means for engaging a major portion of said power diaphragm;
nozzle plate means located on the side of said power diaphragm means removed from said backing means, said nozzle plate means defining a first chamber between said nozzle plate means and said diaphragm means;
internal passageway means through said spool means connecting said inlet passage means to said first chamber;
signal diaphragm means on the side of said nozzle plate removed from said first chamber said signal diaphragm defining a second chamber between said signal diaphragm and said nozzle plate means;
nozzle passage means through said nozzle plate connecting said first chamber to said second chamber;
bleed means connecting said second chamber to ambient;
fluid in said inlet passage flowing through the internal passage in said spool to said first chamber and thence through said nozzle passage means to said second chamber and to ambient through said bleed means in the first position of said spool means;
an end plate on said valve housing, said end plate defining a third chamber between the end plate and said signal diaphragm; and
signal supply means for delivering an actuating signal pressure to said third chamber, said actuating signal deflecting said signal diaphragm toward said nozzle plate to restrict flow through said nozzle passage means into said second chamber whereby the pressure level in said first chamber is increased to impose a pressure load on said power diaphragm and on said backing means to move said spool means to said second position.

14. A fluid valve as in claim 13 wherein:
said flange element engages a major segment of said power diaphragm when a pressure load is imposed on said power diaphragm.

15. A fluid valve as in claim 14 wherein:
said backing element is in bearing engagement with said power diaphragm from the inner periphery thereof to a locus between the inner periphery and the outer periphery; and including
shoulder means engaging the outer periphery of said power diaphragm means, said power diaphragm being held between said shoulder means and said nozzle plate.

16. A fluid valve as in claim 15 wherein:
said shoulder means has an inclined surface for bearing engagement with said power diaphragm when a pressure load is imposed on said power diaphragm.

17. A fluid valve as in claim 16 wherein:
said shoulder surface is inclined from 20° to 40° with respect to the normal to the center line of the valve.

18. A fluid valve as in claim 13 wherein:
said internal passageway means through said spool means terminates in a frustoconical nozzle protruding into said first chamber, and wherein said nozzle plate has a frustoconical shaped inclined entranceway into said nozzle passage means therethrough, said frustoconical entranceway being conformingly shaped with respect to said frustoconical nozzle protruding from said spool.

19. A fluid valve as in claim 18 wherein:
said frustoconical nozzle and conformingly shaped frustoconical inclined entranceway are in alignment and cooperate to enhance delivery of fluid from said internal passageway in the spool to said nozzle passage means.

20. A fluid valve as in claim 19 wherein:
said frustoconical nozzle and conformingly shaped frustoconical inclined entranceway cooperate to effect an eductor action to drain fluid from said first chamber.

21. A fluid valve as in claim 13 wherein:
said nozzle passage means terminates in a short broad based frustoconical projection beyond the surface of said nozzle plate into said second chamber, whereby overpressurization of said signal diaphragm urges a major portion of said signal diaphragm into supporting contact with the surface of said nozzle plate without rupture of said signal diaphragm.

* * * * *